United States Patent [19]

Miller et al.

[11] Patent Number: 4,988,061
[45] Date of Patent: Jan. 29, 1991

[54] METHOD AND APPARATUS FOR THE AUTOMATIC CONTROL OF A GUIDED VEHICLE

[75] Inventors: Luitpold Miller, Ottobrunn; Herbert Jansen, Cologne, both of Fed. Rep. of Germany

[73] Assignee: Thyssen Industries AG, Cologne, Fed. Rep. of Germany

[21] Appl. No.: 320,966

[22] Filed: Mar. 9, 1989

[30] Foreign Application Priority Data

Mar. 10, 1988 [DE] Fed. Rep. of Germany ....... 3807919

[51] Int. Cl.$^5$ ............................................. B61L 27/04
[52] U.S. Cl. ................... 246/182 R; 246/186; 246/167 R
[58] Field of Search ........... 246/182 R, 182 A, 182 B, 246/182 C, 184, 186, 187 R, 187 B, 122 R, 1 R, 167 R, 169 R; 104/300

[56] References Cited

U.S. PATENT DOCUMENTS

| 3,448,433 | 6/1969 | McCune | 246/182 A |
|---|---|---|---|
| 3,566,103 | 2/1968 | Wilcox | 246/182 B |
| 4,005,837 | 2/1977 | Grundy | 246/182 B |
| 4,142,700 | 1/1980 | Ubel | 246/182 B |
| 4,181,943 | 1/1980 | Mercer et al. | 246/182 B |
| 4,279,395 | 7/1981 | Boggio et al. | 246/182 R |
| 4,302,811 | 11/1981 | McClhenny | 246/182 B |
| 4,303,215 | 12/1981 | Maire | 246/182 B |

FOREIGN PATENT DOCUMENTS

| 1405717 | 10/1968 | Fed. Rep. of Germany ... 246/182 B |
|---|---|---|
| 1763748 | 11/1971 | Fed. Rep. of Germany . |
| 2202963 | 8/1973 | Fed. Rep. of Germany ... 246/182 B |
| 2216700 | 11/1973 | Fed. Rep. of Germany . |
| 2238403 | 2/1974 | Fed. Rep. of Germany . |
| 2344328 | 3/1974 | Fed. Rep. of Germany . |
| 2428130 | 1/1975 | Fed. Rep. of Germany ... 246/182 B |
| 2433666 | 1/1976 | Fed. Rep. of Germany ... 246/182 B |
| 2257773 | 5/1976 | Fed. Rep. of Germany . |
| 2626617 | 12/1977 | Fed. Rep. of Germany . |
| 1722396 | 11/1978 | Fed. Rep. of Germany ... 246/182 B |
| 2849008 | 5/1980 | Fed. Rep. of Germany . |
| 3026400 | 1/1981 | Fed. Rep. of Germany . |
| 2054925 | 2/1981 | United Kingdom ............ 246/182 B |

OTHER PUBLICATIONS

"International Conference on Maglev and Linear Drives", IEEE, May 19-21, 1977.
"Der Eisenbehaftete Synchrone Langstatormotor für die Transrapid Versuchsanlage Emsland (TVE)", Georg Siemens, ZEV-Glas. Ann 105, Aug. 1981, pp. 225-232.
"Neubaustrecken der Deutschen Bundesbahn; Diskussionen um Brandschutz in Tunnelanlagen", 112 Magazin der Feuerwehr, pp. 338-347.
"Statusseminar- Schnellbahnen", Berichte Rad/Schiene- und Magnetschwebetechnik, Jun. 1985.
Prieb: "Retten von Personen aus der Schwebebahn", (Brandschutz/Deutsch Feuerwehrzeitung, 7/1987, pp. 275-277).

(List continued on next page.)

from every point of the line on account of its instantaneous momentum at least as far as a preselected subsequent stopping region in the direction of travel, and if a breakdown and/or emergency situation arises the vehicle (2) is brought to a standstill by initiation of automatic train stop or target automatic train stop in this preselected stopping region (FIG. 1).

11 Claims, 4 Drawing Sheets

OTHER PUBLICATIONS

Gruss: "Lange Tunnel, Schnelle Züge-Kommt die Sicherheit zu kurz?", (Die Bundesbahn 7/1986, pp. 491-494).

Niemitz: "Chancen und Grenzen der Automatisierung im Nahverkehr", (Nahverkehrs-Praxis Nr.2/1980, pp. 45-49).

Bianchi: "Die Führerraumsignalisierung auf der Direttissima Rom-Florenz", (Signal u.Draht 77,1985, Heft ½, pp. 9-16).

Vollenwyder: "Automatisierung vom Vorort- und Untergrundbahnen durch Bordrechner", (Elektrische Bahnen, 43.Jahrgang.1982, Heft 6, pp. 133-139).

"Fire Down Below!", Railway Gazette International, Jan. 1988, pp. 27-28.

*Primary Examiner*—Robert P. Olszewiki
*Assistant Examiner*—Mark T. Le

[57] ABSTRACT

The invention concerns a method and an apparatus for the automatic control of a guided vehicle (2) and proposes a new safety concept which, if breakdowns and/or emergencies arise, prevents the vehicle from being stopped in tunnels, on bridges or on pathless terrain. The invention lies in that between preselected stopping regions (11, 12, 13) provided with system for evaluation of passengers and for intervention by rescue services, the vehicle is always operated at such a high speed that even if the driving force fails, travel can still continue Fig.: 2

Fig.: 4

METHOD AND APPARATUS FOR THE AUTOMATIC CONTROL OF A GUIDED VEHICLE

BACKGROUND OF THE INVENTION

The invention concerns a method for the automatic control of a guided vehicle, e.g. a magnetic suspension vehicle, which during its travel is advanced along a predetermined line with a driving force dependent on the line profile and successively passes through stopping regions. The invention also concerns an apparatus with a line on which guided, automatically controllable vehicles, e.g. magnetic suspension vehicles travel, with stopping regions installed along the line and with a device for automatic control of the vehicles.

When employing methods and apparatuses of this kind, up to now it has been usual, if emergency or breakdown suituations arise, to perform automatic train stop or emergency braking immediately until the vehicle comes to a standstill (German patent application Nos. 17 63 748 and 28 49 008). Here, an "emergency situation" means a situation which threatens the lives of the passengers, e.g. a fire breaking out in the vehicle, and a "breakdown situation" on the other hand means a situation which considerably impairs the serviceability or operational reliability of the vehicle, e.g. failure of the drive or power supply. The result of the safety concept pursued up to now is that on account of automatic train stop the vehicle comes to a standstill in a more or less random place, i.e. uncontrolled, and therefore requires that along the while line at the very least ways are provided for the passengers to get out, and preferably also means of evacuating the passengers as well as access routes for rescue services of all kinds.

In case of above-ground wheel/rail vehicles, the fitting of escape and access routes alongside the line involves considerable expanditure, particularly in the region of tunnels, bridges, crossings with roads or pathless terrain. In case of underground vehicles, the expenditure is even greater. Finally in case of suspension, particularly magnetic suspension railways or the like, which are guided on tracks which are supported on stands at a height of several meters above ground, then the problems are multiplied on accound of the fact that to carry out rescue measures, steps, ladders, chutes, footbridges, mobile cranes or the like are required as well.

The many problems which arise particularly when emergency situations occur have already been described a great number of times ("Fire prevention," Deutsche Feuerwehr-Zeitung, 7/1987, pp. 275-277; VFDB (Association for the Promotion of German Fire Prevention) 1/86, pp. 20-24). Now and then it has also been pointed out in this connection that stopping a vehicle in a tunnel when an emergency situation arises is almost never justified and can only aggravate the situation (Railway Gazette International, January, 1988, pp. 27, 28). This has also been recognised by the Federal German Railways; according to their safety concept, if emergnecy and breakdown situations arise, the vehicles should still be capable of running "for a certain minimum period," operation of the emergency brakes by the motor coach driver should make it possible to continue travelling to a "convenient" stopping position, i.e. not lead to immediate stopping of the train on account of automatic train stop, and stopping in tunnels should be avoided (Die Bundesbahn 7/1986, pp. 491-494; 112 Magazin der Feuerwehr, 11 (1986) 7, pp. 338-348).

Even a safety philosophy of this kind cannot meet all requirements in emergency and breakdown situations, as it presupposes reliable functioning of the drive systems. If these fail partly or completely, then it is not possible to reach the end of a tunnel, bridge or the like, so that there are no discernible advantages over immediate stopping by automatic train stop.

By contrast it is the object of the invention to propose a novel safety concept and for this purpose to design the method and apparatus mantioned hereinbefore in such a way that with comparatively simple means and comparatively little expenditure, a large number of difficulties which arise in emergency and breakdown situations can be met.

SUMMARY OF THE INVENTION

The objects are achieved by a method of control in which the vehicle is operated between the stopping regions at least at such a high speed that even if the driving force fails, travel can still continue from every point of the line on account of its instantaneous momentum up to a preselected subsequent stopping region in the direction of travel, and if an emergency situation arises the vehicle is brought to a standstill in this preselected stopping region by initiation of automatic train stop or target automatic train stop.

The apparatus is characterized in that the device is designed in such a way that the vehicles between selected stopping regions are operated at such a high speed that in case of failure of the driving force, they can still continue from any point of the line on account of their inherent momentum, at least as far as a preselected, subsequent stopping region in the direction of travel. The distances between the preselected stopping regions are selected so that this speed is lower than the operating speed of the vehicles which is normal on account of the line profile. The device is designed in such a way that if an emergency situation arises, automatic stopping of the vehicles in the subsequent preselected stopping region in the direction of travel can be carried out by initiating automatic train stop or target automatic train stop.

The invention starts from the knowledge that hitherto existing problems in emergency and breakdown situations arise due to the usually existing need for, if possible, immediate and automatic stopping of the vehicle. The safety concept according to the invention therefore makes provision for letting the vehicle continue travelling when emergency or breakdown situations arise, as far as a definite, preselected stopping region, and only here bringing it to a standstill, irrespective of whether the vehicle can still reach this stopping region with a functioning drive system or only on account of its instantaneous momentum by rolling, floating etc. to a finish. By this means it is possible to provide only a comparatively small number of preselected stopping regions along the whole line, install them at readily accessible points and provide each stopping region with means which make it possible for passengers to get out and be evacuated and rescued quickly and for rescue services to intervene quickly and without hindrance.

BRIEF DESCRIPTION OF THE DRAWINGS

The invention is described by way of example below in connection with the attached drawings. These show:

FIGS. 1 to 3 in schematic and highly simplified views the use of the method according to the invention; and FIG. 4 a schematic block circuit diagram of an apparatus suitable for carrying out the method according to the invention.

DETAILED DESCRIPTION OF PREFERRED EMBODIMENTS

Figure 1:
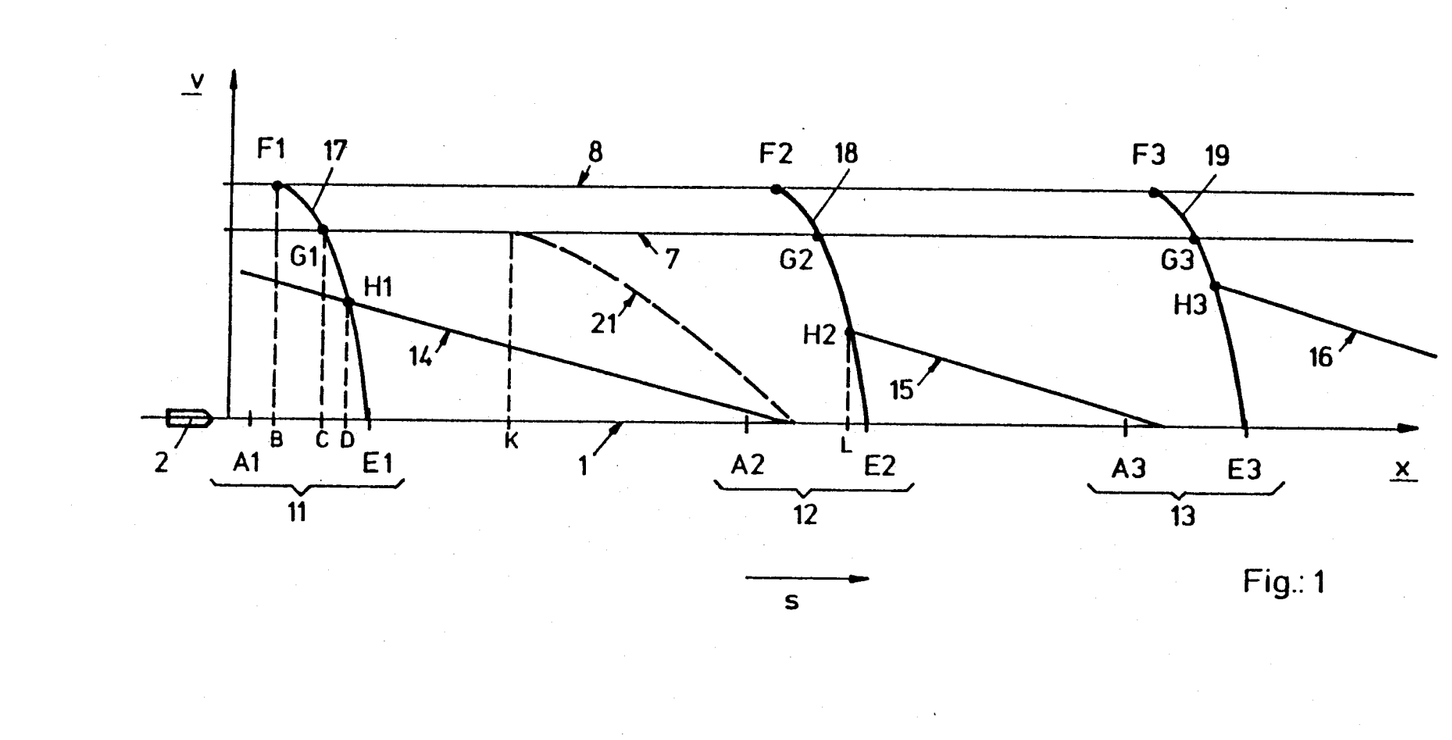
Figure 2:
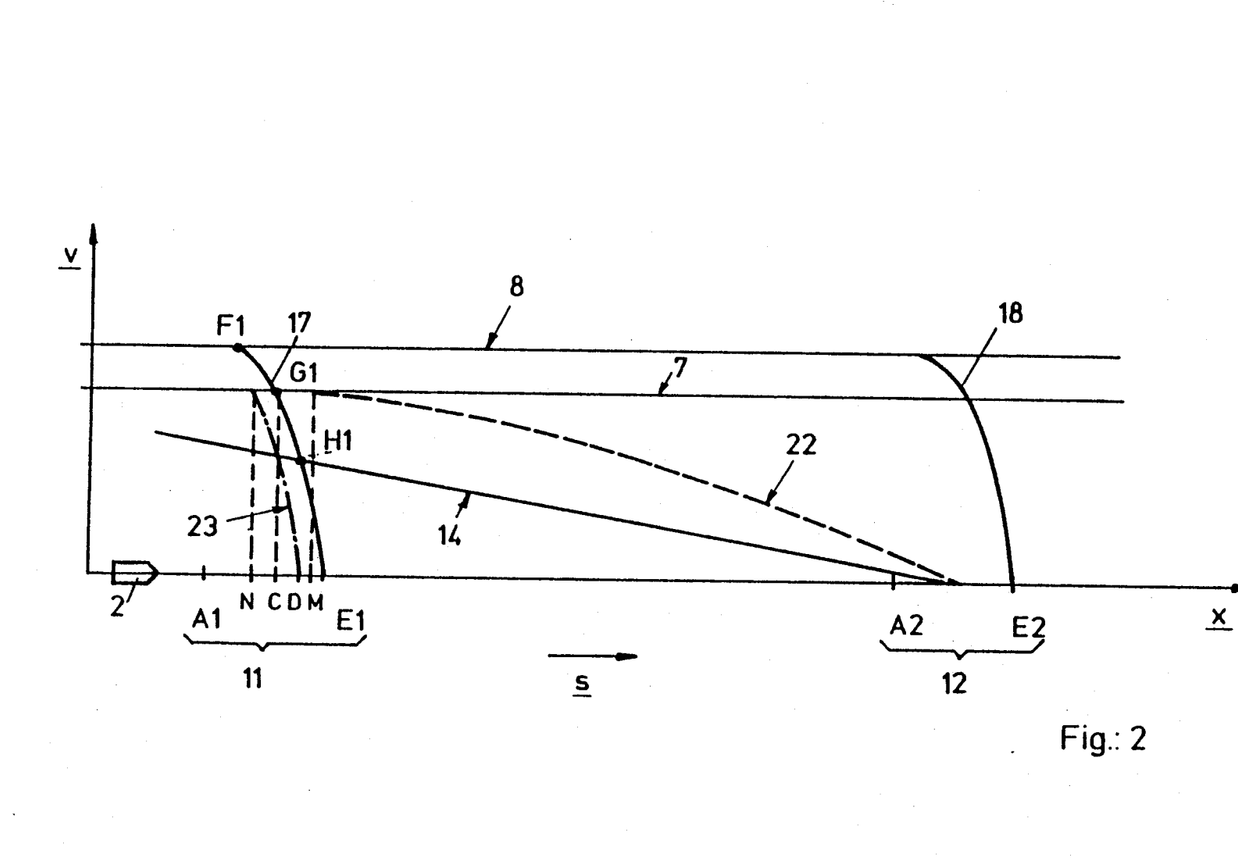

FIGS. 1 to 3 show schematically a line 1 which may be a track for a wheel/rail vehicle, a track supported on stands for a magnetic suspension vehicle, or the like. Depending on the individual case, "vehicle" means a single vehicle or a vehicle composed of a plurality of coaches or cabins and in each case comprising at least one motor coach. The direction of travel of such an imaginary vehicle 2 travelling along the line 1 is indicated with an arrow S. The line 1 forms at the same time the abscissa of an imaginary coordinate system along which the respective place x of the vehicle or the vehicle position which the vehicle has just adopted or might adopt is plotted. The line profile which usaually exists in practice (climbs, descending lines, curves or the like) is omitted for the sake of simplicity. Along the ordinate of the coordinate system is plotted the respective speed v at which the vehicle 2 moves or might move along the line 1.

Along the line 1 are located, at preselected, if necessary different intervals, several preselected stopping regions 11, 12 and 13 which are marked by starting points A1, A2 and A3 and finishing points E1, E2 and E3 and have along the line 1 preselected, if necessary different lengths which are greater than corresponds to the maximum possible vehicle lengths. These stopping regions 11 to 13 may be ordinary stations or station stopping regions which, apart from the usual installations, are also provided with the equipment required for breakdown and emergency situations, particularly escape and rescue routes or the like. But alternatively the stopping regions 11, 12 and 13 may consist of auxiliary stopping regions which are installed in addition between the station stopping regions and which are likewise provided at least with the required escape and rescue routes, can easily be reached by rescue teams as well as rescue or salvage vehicles or the like and if need be also comprise the steps, ladders, chutes or the like required for evacuation of the passengers as well as sidings for shunting defective vehicles. In addition, of course, further stopping regions may be provided for other purposes, which however are not classed with the "preselected" stopping regions and are not essential to the invention.

FIG. 1 also indicates by minimum lines 14, 15 and 16 the minumum speeds referred to the front of the vehicle at which the vehicle 2 must be moved between two stopping regions 11 to 13 so that, even in case of failure of its drive system and allowing for other circumstances, particularly the line profile, it can still reach at least the next stopping region on its own, i.e. on account of its inherent kinetic energy, and move into it with its full length. For FIG. 1 this means that the vehicle 2 e.g. on leaving stopping region 11 (finishing point E1) must have reached a comparatively high minimum speed, but this can become lower and lower as the vehicle 2 approaches stopping region 12 (starting point A2) becausee the distance between the vehicle 2 and the next preselected or permitted stopping region 12 becomes smaller and smaller. The minumum lines 14 to 16 shown as straight lines can in reality be any desired curved which, depending on the line profile (climbs, drops, curves) and depending on any other chosen additional factors (e.g. maximum conceivable head wind, maximum friction between vehicle and line or the like), assign a minumum speed to each point x.

The operating speed of the vehicle provided for normal cases is indicated in FIG. 1 by a line 7 which for simplicity's sake is parallel to the x-axis and thus constitutes a constant operating speed. In fact, it may be any curve which, depending on the line profile and other factors, assigns a given operating speed to each point x of the line 1. In this case, at least between the respective finishing points E and the starting points A of the next stopping regions 11 to 13, the operating speed (line 7) at any point is always greater than the mimumum speed provided for the same point (minimum lines 14 to 16).

In addition, in a manner known in the art each point x of the line may also be assigned a maximum speed (maximum line 8) to prevent the speed of the vehicle from exceeding a value which is critical for the load carrying capacity of the line or the vehicle (e.g. German patent application Nos. 22 16 700 and 23 44 328). The given operating speed is always lower than the maximum speed.

From the maximum line 8 (points of intersection F1 and F3), braking curves 17, 18 and 19 lead to the finishing points E1 to E3. These braking curves 17 to 19 represent in each case the deceleration of the vehicle when automatic train stop or emergency braking is carried out until it stops; here, automatic train stop means a braking manoeuvre in which all vehicle brakes available or provided for this are operated at full power. Braking curves of this kind arise in particular from the respective frictional conditions, if friction brakes are concerned, or other parameters if other brakes such are electric brakes (engine brakes) or magnetic brakes are concerned. The braking curves 17 to 19 reveal where automatic train stop must be initiated for the vehicle at the latest, in order to be able to bring it to a standstill from any speed exactly at the end of a stopping region 11 to 13. The point of intersection F1 thus means that automatic train stop from the maximum speed must be initiated at the latest at the associated point B of the line 1. When travelling at the operating speed, automatic train stop must be carried out at the latest at the point C corresponding to a point of intersection G1, and when travelling at the minimum speed at the latest at the point D corresponding to a point of intersection H1. The same applies to points of intersection F2, F3, G2, G3, H2 and H3, which can be seen in FIG. 1.

Execution of the method according to the invention is apparent from FIGS. 1 to 3 as follows:

If the vehicle 2 is travelling at the operating speed provided by line 7 between points E1 and A2, referred to the front of the vehicle, and if the vehicle 2 is to be brought to a standstill, for example within stopping region 12, target braking extending along a line 21 could be initiated e.g. at one point K, where target braking means a braking manoeuvre corresponding to normal operation, which is completed at a given point within the stopping region 12. If the vehicle 2 is to pass through the stopping region 12, its speed can be maintained along line 7 or varied as desired between the maximum line 8 and the minumum line 14. In this case, care must be taken only that the instantaneous actual speed must have reached or exceeded the minimum speed defined by the minumum line 15 at the latest on reaching point L.

If an emergency situation threatening the passengers arises between the stopping regions 11 and 12, target automatic train stop is initiated. This basically differs from target braking along line 21 only in that it always results in stopping of the vehicle in the next preselected stopping region 12, irrespective of whether the vehicle should stop in the next stopping region 12 in normal cases or not. As the vehicle advanced at least at the minimum speed before initiating target automatic train stop, a braking manoeuvre of this kind is possible irrespective of whether the device of the vehicle 2 is impaired by a fire or the like. On no account, however, does target automatic train stop take place in such a way that the vehicle comes to a standstill before or not until after the stoping region 12.

If the emergency situation arises while travelling accoring to FIG. 2 between the starting and finishing points A1, E1 of stopping region 11, then various braking manoeuvres are possible, according to the point at which the vehicle 2 is exactly located and what instantaneous speed it has. If e.g. while travelling at the operating speed (line 7) the vehicle 2 has just reached a point M which lies behind point D in the direction of travel, then target automatic train stop is carried out e.g. along a broken line 22 to the next stopping region 12, because the vehicle 2 could no longer be stopped within the stopping region 11 even by automatic train stop. If on the other hand while travelling at the operating speed the vehicle is located for example at point C or at a point N in front of it, then it is brought to a standstill preferably by automatic train stop or target automatic train stop e.g. along the braking line 17 or along a dot-dash line 23, still within the stopping region 11 through which it has just passed. However, it would also be conceivable to bring the vehicle to a standstill by target automatic train stop only in the next stopping region 12, provided that its speed, as shown in FIG. 2, at point N and at point C is greater than the minimum speed which is yielded by the minimum line 14 or an extension thereof beyond the point of intersection H1.

Previously described possibilities concern the case in which the vehicle 2 is normally to pass through the stopping region. On the other hand, maybe, the possibilities shown in FIG. 3 are provided in the event that the vehicle 2 has been stopped in a preselected stopping region and is then accelerated from a standstill in order to travel to the next station stopping region.

Normally, e.g. starting from a point P, the vehicle is acceleratd with such high acceleration that at point C it has a greater speed than corresponds to the minimum speed. This normal case is indicated by a dashed line 24. If in this case an emergency situation arises, the vehicle can, depending on whether it can still be stopped along braking line 17 or not, either be stopped again within the same stopping region 11 or allowed to travel to the next stopping region due to its existing kinetic energy and stopped there; naturally, stopping in the same stopping region is preferred.

The procedure may be similar if there is a breakdown situation which, in comparison with an emergency situation, does not threaten the life of the passengers and is characterised by for example a drive failure, a power failure or the like. In such a case, however, automatic control is preferably arranged so that the vehicle is allowed to go on as long as its actual speed is still above the respective minimum speed, as a breakdown situation of this kind can possibly be remedied and does not always have to result in stopping of the vehicle.

A special breakdown situation could arise due to the fact that the vehicle 2 on starting from a stopping region is accelerated along a dot-dash line 25 (FIG. 3), i.e. with too little acceleration. In this case, immediate target automatic train stop can be initiated. However, automatic train stop must be initiated no later than on reaching a point R where the current speed curve intersacts with the braking line 17, because it can no longer be guaranteed with absolute certainly that the vehicle 2 will, no later that at point E1, have the mimimum speed required to reach the next stopping region. The procedure is similar if the vehicle for any reason at all passes through the stopping region at a speed which is lower than the operating speed (line 7).

It follows that for reliably stopping the vehicle 2 in any of the stopping regions, its speed must only between two stopping regions be greater than corresponds to the minimum speed yielded by the minimum lines 14 to 16. Within a stopping region, on the other hand, the actual speed of the vehicle 2 can be any desired speed. According to the invention, it is only ensured that when an emergency or breakdown situation arises, braking in the stopping region which has just been traversed always takes place at the latest when the actual speed of the vehicle at the point at which its speed curve intersects with the braking line 17 to 19 is smaller than the required minumum speed (minimum lines 14 to 16).

According to the safety concept described schematically with reference to FIGS. 1 to 3, the vehicle 2 is brought to a standstill exclusively in the stopping regions, regardless of the respective breakdown or emergency situation. In order to avoid excessively long travelling times between two preselected stopping regions, their spacing is selected sufficiently low according to the operating speeds which can usually be attained, so that enough auxiliary stopping regions are provided between the station stopping regions, and therefore rapid stopping of the vehicle 2 is also possible in difficult emergency situations. For a safety concept of this kind it is immaterial whether a wheel/rail vehicle, an ordinary suspension vehicle, a magnetic suspension vehicle or some other guided vehicle is concerned, as the distance between two stopping regions essentially depends only on how long a distance the respective vehicle can still cover after reaching the operating speed even in case of total failure of the drive, allowing for the existing line profile and/or other parameters. This yields the advantage that the minimum speed as a rule can be selected so great that the vehicle can pass through all existing tunnels, bridges or the like on its own and therefore no stopping regions need to be provided in or on them.

The length of the stopping regions can basically be selected freely provided that it is only that much greater than the respective vehicle length that after starting from the stopping region, an emergency stop can still be performed in the same stopping region.

In application of the rescue strategy according to the invention on magnetic suspension railways, advantageously it is ensured by high redundancy that even in case of breakdown or emergency the suspended state is maintained, i.e. as a result of malfunction of the carrying magnets the vehicle is not lowered and placed with its runners on the carrying rails provided therefor, so that even after the drive is switched off or fails the vehicle can still cover a comparatively long distance on its own. Alternatively, however, it would be possible to provide the runners and the carrying rails with linings having a low coefficient of friction, or to use rollers or wheels instead of runners in order to reduce the minimum speeds required at any given time.

Of course, the method described presupposes that some systems are fully functional, e.g. the brakes used for braking in breakdown and emergency situations, the track, etc., which can be ensured by high redundancy, particularly in case of magnetic suspension railways. In this respect the invention is no different to other safety concepts.

If points, main signals etc. are provided along the line, a preselected stopping region is advantageously arranged in front of each of them in the direction of travel, in order to be able to exclude the possibility of overrunning incorrectly set points or the like.

Use of the method according to the invention is explained below by the example of an apparatus suitable for magnetic suspension vehicles.

The vehicles are guided in a known manner by means of integrated carrying and drive systems (e.g. German patent application Nos. 22 38 403 and 22 57 773) on a track which is supported on stands above ground. The track is preferably encompassed by the vehicles in a U-shape, in order to avoid derailments reliably even at high speeds. The drive and braking system includes for example a long-stator linear motor. All control of the vehicles is carried out automatically from a central signal box by means of monitoring and control systems disposed inside and/ore outside the vehicles ("International Conference on Maglev and Linear Motors," Las Vegas, May 19–21, 1987, pp. 171–188; "Status Seminar on High-Speed Railways, Wheel/Rail and Magnetic Suspension Technology," Nuremberg, June 1985; "The iron-clad synchronous long-stator motor for the 'Transrapidd-Versuchsanlage Emsland TVE,'" ZEV-Glasers Annalen, Year 103, 1981, Book 7/8, pp. 225–232.

For incremental detection of the respective actual value of vehicle position, along the track are provided measuring strips which comprise vehicle position coding means which are scanned by sensor systems mounted on the vehicles. From the vehicle position signals obtained in this way are derived at the same time, by means of an analyser circuit, signals which indicate the instantaneous direction of travel and the respective actual speed of the vehicles (German patent application No. 33 03 961). All those signals are passed on for example by radio to receivers mounted beneath the track, and from there to the central signal box.

An apparatus suitable for carrying out the method according to the invention is shown roughly schematically in FIG. 4.

A conventional drive and braking system 31 containing the long-stator linear motor and designed as a regulating device is connected at its input to a comparator 32, one input of which is connected to the output of a travel computer 33. An above-mentioned sensor system 34 which detects the respective vehicle position and is carried on the vehicle transmits its output signals to an analyser circuit 35 which at one output 36 emits a signal which corresponds to the actual speed of the vehicle and is passed to a second input of the comparator 32. In the travel computer 33 are stored, according to the line profile of the respective line, inter alia the operating speeds desired for each point or each vehicle position and preset for normal running. Moreover, a signal indicating the respective vehicle position (actual value) and occurring at one output 42 of the analyser circuit 35 and a signal indicating the current direction of travel and occurring at one output 43 of the analyser circuit 35, are passed to the travel computer 33. As a result the travel computer 33 is capable, during normal running, of assigning each current vehicle position a nominal signal for the operating speed which is dependent on the direction of travel and on the respective line profile, or passing it to the comparator 32.

The differential signal picked up by the comparator 32 between the respective actual and nominal signals is processed by the drive and braking system 31 in such a way that the vehicle adopts an actual speed which comes as close as possible to the nominal speed or the normal operating speed indicated in FIGS. 1 to 3 by line 7.

The respective nominal speed is modified in the travel computer 33 with reference to a signal which indicates the next preselected stopping region. The latter is as a rule a station stopping region which is fixed by means of a control device 37 from the central signal box. The signal produced by the control device 37 is passed to the travel computer 33 by a switching member 38 which is depicted as a mechanical switch with one movable contact 39 and two fixed contacts 40, 41, but in actual fact preferably consists of an electronic switch. In cases of normal, undisturbed operation, contact 39 is connected to fixed contact 40, so that the signal indicating the next station stopping region is fed to the travel computer 33. The vehicle is therefore braked e.g. along line 21 (FIG. 1) and brought to a standstill in the preset station stopping region.

Associated with the drive and braking system 31 is a monitoring system 44 which comprises a limit profile computer 45 to which are fed the signals occurring at the outputs 36, 42 and 43 of the analyser circuit 35. Inter alia the maximum permitted speeds and minimum required speeds for each point of each vehicle position are stored in the limit profile computer 45, depending on the line profile of the respective line, so that by contrast with the travel computer 33 it assigns each point of the line both a maximum speed according to the maximum line 8 in FIGS. 1 to 3 and a minimum speed according to the minimum lines 14 to 16 in FIGS. 1 to 3. In this case a signal indicating the maximum speed occurs at one output 46 and a signal indicating the minimum speed occurs at one output 47 of the limit profile computer 45, the maximum and minimum speeds each depending on the current vehicle position (actual value), the respective direction of travel and the respective line profile. The two outputs 46 and 47 and the output 36 of the analyser circuit 35 are connected to a monitoring computer 49 which has three analyser units 50, 51 and 52.

In unit 50, the actual speed of the vehicle is constantly compared with the maximum permitted speed and the minimum required speed. If the actual speed of the vehicle remains between these two speeds, then a signal which indicates an operative state of "in order" occurs at one output 53.

In unit 51, the actual speed of the vehicle is constantly compared with the maximum permitted speed. If the latter is reached, there occurs at one output 54 a control signal which indicates an operative state of "too fast" and which is transmitted by a wire 55 to the drive and braking system 31 and switches off the latter. At the same time, at one output 56 occurs a control signal which is transmitted by a wire 57 to an auxiliary braking system 58 of the vehicle and operates the latter until the actual speed of the vehicle is again below the maximum permitted speed, the control signals at the outputs 54 and 56 disappear and normal operational control is resumed.

In unit 52, the actual speed of the vehicle is compared with the minimum required speed. If the actual speed is greater than the minimum speed, there are no control signals at outputs 59 and 60. If, on the other hand, the actual speed drops to the minimum speed, at output 59 there occurs a control signal which indicates an operative state of "too slow" and switches off the drive and braking system 31 by the wire 55, while at output 60 there occurs a control signal which is fed to a braking control computer 61. Further inputs of this braking control computer 61 are connected to the outputs 36, 42 and 43 of the analyser circuit 35 and one output 62 of the limit profile computer 45. At this output 62, which is also connected to the fixed contact 41 of the switching member 38, is in each case a signal which indicates the next station or auxiliary stopping region in which the vehicle can be stopped. The data required for carrying out automatic train stop or target automatic train stop are stored inter alia in the braking control computer 61, depending on the line profile of the respective line.

The mode of operation of the apparatus according to FIG. 4 is essentially as follows:

During normal operation, essentially only the drive and braking system 31 operates; the control device 37 predetermines at any given time the next station stopping region at which the vehicle is to be brought to a standstill. On the basis of regulation, the actual speed is constantly caused to follow the nominal speed preset by the travel computer. The monitoring computer 49 checks that the preset operating speed is essentially observed and neither the maximum nor the minimum speed is reached.

If an emergency situation arises, particularly a fire or the like, the switching member 38 is operated to switch the movable contact 39 over to the fixed contact 41. This can be carried out by means of a regulating device 63 which is designed for example as an emergency lever which can be operated by the staff or passengers of the vehicle, or as a device which automatically indicates the emergency situation. The result of switching is that the signal occurring at the output 62 of the limit profile computer 45 is now fed to the travel computer 33. During travel between two stopping regions this always indicates the next stopping region in the direction of travel. The travel computer 33 therefore initiates target automatic train stop via the drive and braking system 31, e.g. along a line 21 in FIG. 1, to the stopping region immediately following and not to the station stopping region which is preset by the control device 37 and which may be much further away. If the vehicle is just within any stopping region, then a signal indicating the stopping region which is just being traversed occurs at the output 62 preferably as long as the vehicle can still be stopped in time at least by automatic train stop to be carried out by means of the travel computer 33 and the drive and braking system 31, e.g. along the lines 23, 17 (FIG. 2), depending on its actual speed, its instantaneous vehicle position and the line profile. As soon as this is no longer possible, the signal indicating the next stopping region occurs at the output 62. Generation of the desired signals at the output 62 can be ensured by appropriate programming of the limit profile computer 45. It would moreover be possible to transmit a signal generated by the regulating device 63 to the braking control computer 61, in order also to operate the auxiliary braking system 58 in an emergency.

If the emergency situation is simultaneously connected with a failure or a breakdown of the drive and braking system 31, then only the auxiliary braking system 58 is available for reliably braking the vehicle in time. Therefore it may be generally advantageous to omit the switching member 38 altogether and permanently connect the control device 37 to the input of the travel computer 33. In this eventuality, when the regulating device 63 becomes operative, a control signal generated by the latter on the one hand is used via the wire 55 to switch off the drive and braking system 31 and on the other hand is fed via a wire 64 to the braking control computer 61 which is set in operation thereby and then initiates the required automatic train stop and target automatic train stop, so that the drive and braking system 31 is used during normal operation and the auxiliary braking system 58 in emergency situations.

In case of an emergency and/or breakdown situation which is caused e.g. by a fault in the drive and braking system 31 or by failure of the driving energy and results in a reduction in travelling speed, on reaching the minimum speed the braking control computer 61 becomes operative, so that automatic train stop or target automatic train stop is initiated by the auxiliary braking system 58 in such a way that the vehicle is stopped in the station or auxiliary stopping region which is just being traversed or the next one. For this, a signal indicating the stopping region being traversed or the next one is in each case transmitted to the braking control computer 61 from the output 62 of the limit profile computer 45, so that it can calculate the control signals required for stopping in this stopping region for actuation of the auxiliary braking system 58 with the aid of the remaining data (line profile, vehicle position, actual speed and direction of travel). The procedure may be similar if other systems of the vehicle or apparatus are disturbed, for example points are not set correctly, and monitoring means 65 associated with these systems indicate, regardless of the respective actual speed, that stopping of the vehicle in the next stopping region is desired or necessary. The procedure may also be such that the braking control computer 61 initiates target automatic train stop only if the actual speed has already reached the minimum speed, while otherwise, if the actual speed is still sufficient, it is attempted to reach the next station stopping region preset by the control device 37.

The auxiliary braking system 58 is advantageously designed as a high-redundancy braking system consisting of a plurality of brakes 66, at least one of which can be rendered operative in case of emergency or breakdown for performing the braking manoeuvre required at any given time. In a preferred embodiment each brake is designed as a double jaw brake (German patent No. 30 04 705) or an eddy current brake and in such a way that even in case of failure of one or more of these brakes, uncontrolled automatic train stop is not carried out automatically.

The invention is not confined to the practical examples described, which can be modified in many ways. This applied on the one hand to the type of guided vehicle, as the invention can be applied to conventional wheel/rail vehicles or the like instead of magnetic suspension vehicles. On the other hand, to initiate and perform the braking manoeuvres described, all drive and braking systems known in the art (German patent application Nos. 26 26 617 and 30 26 400) are provided and controlled and/or monitored in the manner described. Moreover it is advantageous always to select the minimum speed slightly higher than corresponds to the minimum speed actually required to reach the next stopping region, in order to create a sufficiently high speed reserve for unforeseen circumstances and make it possible for automatic train stop or target automatic train stop, which becomes necessary on reaching the minimum speed, to be performed along a curve which does not need to be identical with the minimum lines 14 to 16 indicated in FIGS. 1 to 3. Finally, it is possible to design differently the systems which are shown only as an example in FIG. 4, and to combine them at least partially or integrate them in a complex operational guide system.

We claim:

1. A method for operating a rail vehicle advanced by a driving means along a line having a line profile, along which line a plurality of stopping regions are provided, said method comprising steps of:

setting said plurality of stopping regions at predetermined distances;

operating said vehicle between said stopping regions substantially at a normal speed;

maintaining the speed of said vehicle above a predetermined minimum speed at all time in a non-emergency running mode of said vehicle, said predetermined minimum speed being varied and lower than said normal operating speed and further being determined as a function of at least said line profile and the instantaneous distance of the vehicle from the next subsequent one of said stopping regions in the direction of travel of the vehicle, further, said predetermined minimum speed being set such that in case of emergency and said driving means stopped, said vehicle is still able to run by virtue of the inherent kinetic energy of the vehicle from any point of said line between any two of said stopping regions to arrive the next one of said subsequent stopping regions;

braking said vehicle during such travel in such a way that the vehicle comes to a standstill within said next subsequent stopping region;

said predetermined distances and said predetermined minimum speed being correlated in the manner that the stopping of said vehicle outside the stopping regions is prevented even in a case if failure of said driving means has occurred.

2. A method according to claim 1 including the steps of: bringing the vehicle, if the emergency situation arises during the travel of the vehicle within a particular stopping region, to a standstill within said particular stopping region on account of the instantaneous speed of the vehicle, by initiating an automatic braking; and, if such standstill is impossible on account of the instantaneous speed, braking the vehicle at the most to such an extent that the vehicle can reach the next subsequent stopping region by virtue of the instantaneous kinetic energy of the vehicle even in case of failure of the driving force.

3. A method according to claim 1 or 2, including the step of allowing the vehicle, if a breakdown situation arises, to travel up to another one of said subsequent stopping regions as compared with the next subsequent stopping region as long as the instantaneous speed of the vehicle is high enough for the vehicle to reach said other subsequent stopping region by virtue of the instantaneous kinetic energy of the vehicle even in case of failure of said driving force.

4. An apparatus for operating a rail vehicle advanced by a driving means along a line having a line profile which includes plurality of stopping regions spaced with predetermined distances, said apparatus comprising:

automatic control means including means for operating said vehicle between said stopping regions substantially at a normal speed; means for maintaining the speed of said vehicle above a predetermined minimum speed at all time in a non-emergency running mode of said vehicle, said predetermined minimum speed being varied and lower than said normal operating speed and said predetermined minimum speed being a function of at least said line profile and the instantaneous distance of the vehicle from the next subsequent one of said stopping regions in the direction of travel of the vehicle, further, said predetermined minimum speed being at a level that, in case of emergency, when said driving means stops running, said vehicle is still able to run by virtue of the inherent kinetic energy of the vehicle from any of point of said line between any two of said stopping regions to arrive the next one of said subsequent stopping regions;

braking means for braking said vehicle during such travel in such a way that the vehicle comes to a standstill within said next subsequent stopping region;

said automatic control means correlating said predetermined distances and said predetermined minimum speed in a manner that the stopping of said vehicle outside the stopping regions is prevented even in a case if failure of said driving means has occurred.

5. An apparatus according to claim 4, wherein said stopping regions include station stopping regions and auxiliary stopping regions.

6. An apparatus according to claim 4 or 5, comprising: means for controlling said vehicle within any of said stopping regions such that at an end of a stopping region of the vehicle travels at a speed at least equal to said minimum speed.

7. An apparatus according to claim 4 or 5, comprising: means for controlling said vehicle within any of said stopping regions such that the vehicle is stopped within said stopping region if the speed of the vehicle is below said minimum speed.

8. An apparatus according to claim 4, wherein a stopping region is installed before preselected points of the line including switches and main signals.

9. An apparatus according to claim 4, comprising an auxiliary braking system for automatically braking the vehicle in case of said failure such that the vehicle comes to a standstill within the next subsequent stopping region.

10. An apparatus according to claim 4, comprising a monitoring computer for monitoring the actual speed of the vehicle and for initiating an automatic braking of the vehicle at the next subsequent stopping region if the actual speed of the vehicle between two stopping regions drops to said minimum speed.

11. An apparatus according to claim 4, including means for allowing the vehicle, if a breakdown situation arises, to travel up to another one of said subsequent stopping regions are compared with the subsequent stopping region as long as the instantaneous speed of the vehicle is high enough to allow the vehicle to reach said other subsequent region by virtue of the instantaneous kinetic energy of the vehicle in case of failure of said driving force.

* * * * *